(12) United States Patent
Bergmann

(10) Patent No.: US 8,610,990 B2
(45) Date of Patent: Dec. 17, 2013

(54) DRIVER FOR A POCKELS CELL

(75) Inventor: Thorald Horst Bergmann, Murnau (DE)

(73) Assignee: Bergmann Messgeraete Entwicklungs KS, Murnau (DE)

( * ) Notice: Subject to any disclaimer, the term of this patent is extended or adjusted under 35 U.S.C. 154(b) by 119 days.

(21) Appl. No.: 13/123,905

(22) PCT Filed: Jun. 30, 2009

(86) PCT No.: PCT/EP2009/004723
§ 371 (c)(1),
(2), (4) Date: Apr. 21, 2011

(87) PCT Pub. No.: WO2011/009467
PCT Pub. Date: Jan. 27, 2011

(65) Prior Publication Data
US 2011/0194576 A1    Aug. 11, 2011

(51) Int. Cl.
*G02F 1/03* (2006.01)
(52) U.S. Cl.
CPC .............. *G02F 1/0305* (2013.01); *Y10S 359/90* (2013.01)
USPC .......................................... 359/257; 359/900
(58) Field of Classification Search
USPC .......................... 359/257, 245, 900
See application file for complete search history.

(56) References Cited

U.S. PATENT DOCUMENTS

| | | |
|---|---|---|
| 7,260,121 B2 | 8/2007 | Bergmann |
| 2004/0101001 A1 | 5/2004 | Bergmann |
| 2008/0018977 A1 | 1/2008 | Bergmann |
| 2009/0292277 A1 | 11/2009 | Sierra |

FOREIGN PATENT DOCUMENTS

DE    3630775 A    3/1988

*Primary Examiner* — Jack Dinh
(74) *Attorney, Agent, or Firm* — Andrew Wilford

(57) ABSTRACT

The invention relates to an activation circuit for a Pockels cell, comprising a first circuit node (P1), which can be connected to a first connection of the Pockels cell (CP), and a second circuit node (P2), which can be connected to a second connection of the Pockels cell (CP), wherein the first circuit node (P1) is connected by means of a first line to a first electrical potential (HV1) across a first switch (S1B) and by means of a second line to a second electrical potential (HV2) across a second switch (S1A), and the second circuit node (P2) is connected by means of a third line to a third electrical potential (HV3) across a third switch (S2B) and to a fourth electrical potential (HV4) across a fourth switch (S2A), and HV1 is more positive than HV2 and HV3 is more positive than HV4, wherein the difference of the potentials (HV1–HV4) is greater than the difference of the potentials (HV1–HV2) and the difference of the potentials (HV3–HV4).

13 Claims, 3 Drawing Sheets

DRIVER FOR A POCKELS CELL

CROSS REFERENCE TO RELATED APPLICATIONS

Figure 1:
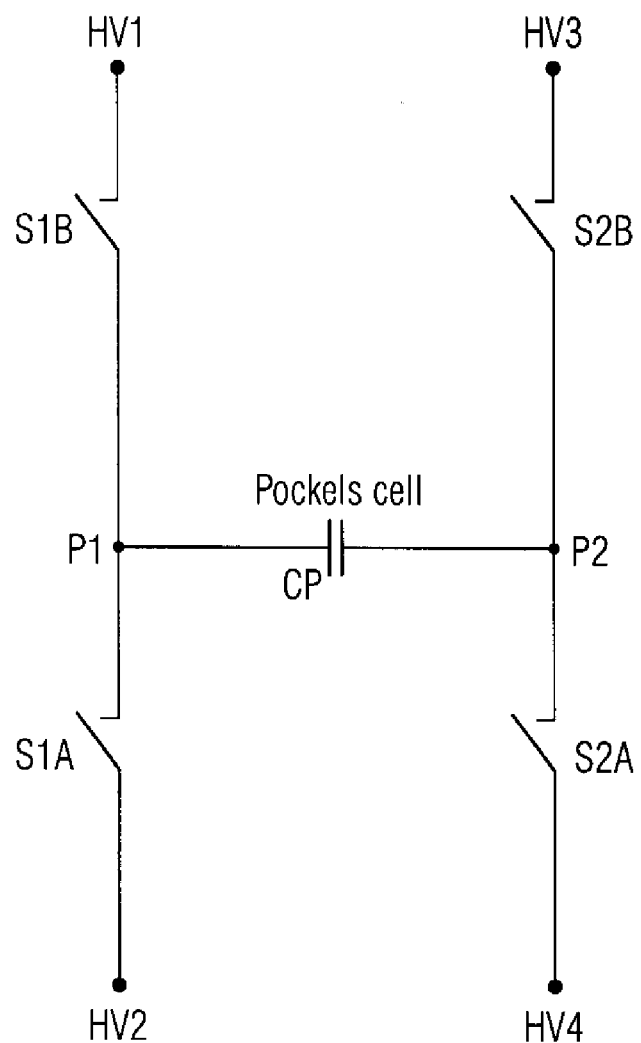

This application is the US national stage of PCT application PCT/EP2009/004723, filed 30 Jun. 2009, published 27 Jan. 2011 as WO2011/009467, and claiming the priority of PCT patent application PCT/EP2009/004723 itself filed 30 Jun. 2009, whose entire disclosures are herewith incorporated by reference.

The invention relates to a driver for a Pockels cell as it reads from the preamble of claim 1, it also relating to a Pockels cell with a driver, use of a Pockels cell in a pulsed laser system and to a method for gating a Pockels cell with a driver.

A Pockels cell with a suitable high-voltage power supply can be used to optically switch, i.e. to tweak the intensity or beam direction of short laser pulses with a duration of a few nanoseconds (ns) or ultrashort laser pulses with a duration of picoseconds (ps) or femtoseconds (fs). In principle, laser beam sources for ultrashort pulses always have very high repetition rates (exceeding 10 MHz, typically 70-200 MHz for solid-state lasers) and low pulse energies (typically 0.1-50 nJ). When single or groups of ps or fs laser pulses are needed a Pockels cell is often used to select these pulses, in which case the voltage has to be switched fully ON between two pulses beamed by the laser beam source typically in a time spacing of 6-15 ns to be returned fully OFF after throughput of one or more laser pulses within 6-15 ns.

Likewise a Pockels cell can be used for specifically segmenting a continuous laser beam.

Suitable drivers for a Pockels cell are described, for example, in the German patent DE 102 51 888 B4 [U.S. Pat. No. 7,260,121] which as substantially described therein are so-called bridge circuits in which the Pockels cell is disposed between two circuit nodes as the starting point for four wires corresponding to the four legs of the letter H, this being the reason why this arrangement is also termed a H configuration. Shown in FIG. 4 of this patent is one such arrangement in which a first circuit node is connected to a first wire across a first switch having a positive high-voltage potential and to a second wire across a second switch to a GND potential and to a second circuit node by a third wire across a third switch having the positive high-voltage potential and to a fourth wire across a fourth switch to the GND potential.

The switches used in such drivers are high-voltage switches capable of switching voltages up to a few kilovolts or a few 10 kilovolts. The switching speed of transistor high-voltage switches is normally in the region of a few nanoseconds and the high-voltage switches can be gated, for example, by TTL signals of a few volts. The inner structure of these high-voltage switches is described in the German patent DE 3 630 775 C2. The maximum repetition rate with which such a high-voltage switch and thus the Pockels cell can be powered is dictated, among other things, by the maximum permissible consumption of electric power across the high-voltage switch.

The object of the present invention is to define a driver for a Pockels cell with which the maximum permissible repetition rate can be increased.

This object is achieved by the features of claim 1. Advantageous aspects and further embodiments are the subject matter of the sub-claims and the further independent claims.

One salient aim of the present invention involves configuring the driver so that the electric power consumed by the high-voltage switches is now better shared by them so that none of the switches needs to switch the full switching voltage required by the Pockels cell by itself. This now makes it possible for the switches to handle higher repetition rates until the maximum permissible consumption of electric power of each switch is attained.

A driver in accordance with the invention for a Pockels cell comprises a first circuit node connectable to a first terminal of the Pockels cell, and a second circuit node connectable to a second terminal of the Pockels cell, whereby the first circuit node is connected by means of a first wire conductor to a first electric potential across a first switch and by means of a second wire conductor to a second electric potential across a second switch, and the second circuit node is connected by means of a third wire conductor to a third electric potential across a third switch and to a fourth electric potential across a fourth switch, whereby the difference between the first electric potential and the fourth electric potential is greater than each difference between the first and second potential and third and fourth potential respectively.

In one aspect the second and third potential may be the same, for example, GND potential.

In another aspect a first electric potential is provided by the positive pole of a voltage source and the fourth electric potential by the negative pole of the voltage source.

With such drivers a voltage can be applied to the Pockels cell by simultaneously closing the first switch and the fourth switch and opening the second switch and the third switch. The Pockels cell can be switched OFF by simultaneously opening the first switch and the fourth switch and closing the second switch and the third switch.

The switching voltage 2·HV required by the Pockels cell is thus not switched by the just one switch to the Pockels cell but shared by two switches each forwarding in amount a potential HV to the Pockels cell. In other words the two switches are no longer required to handle the full 2·HV of the Pockels cell, each instead forward a potential HV. Now, because of this reduction in handling the power the switches can be powered with a higher repetition rate before attaining the limit of their power handling capacity.

In yet another aspect the second electric potential and the third electric potential may equal each other. It is just as possible, however, that the second electric potential and the third electric potential differ from each other.

Figure 2:
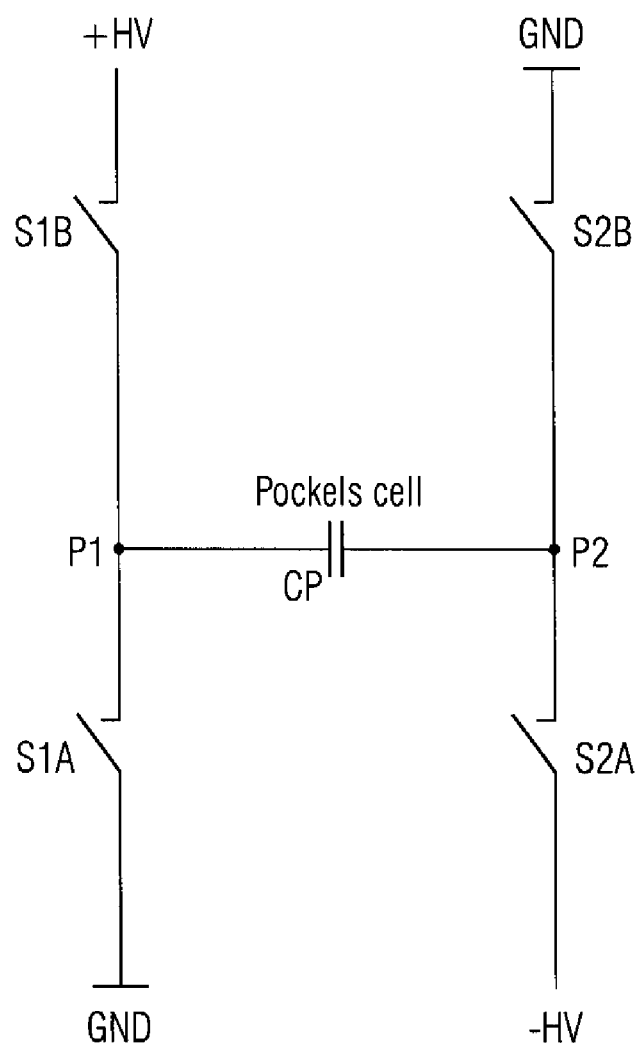
Figure 3:
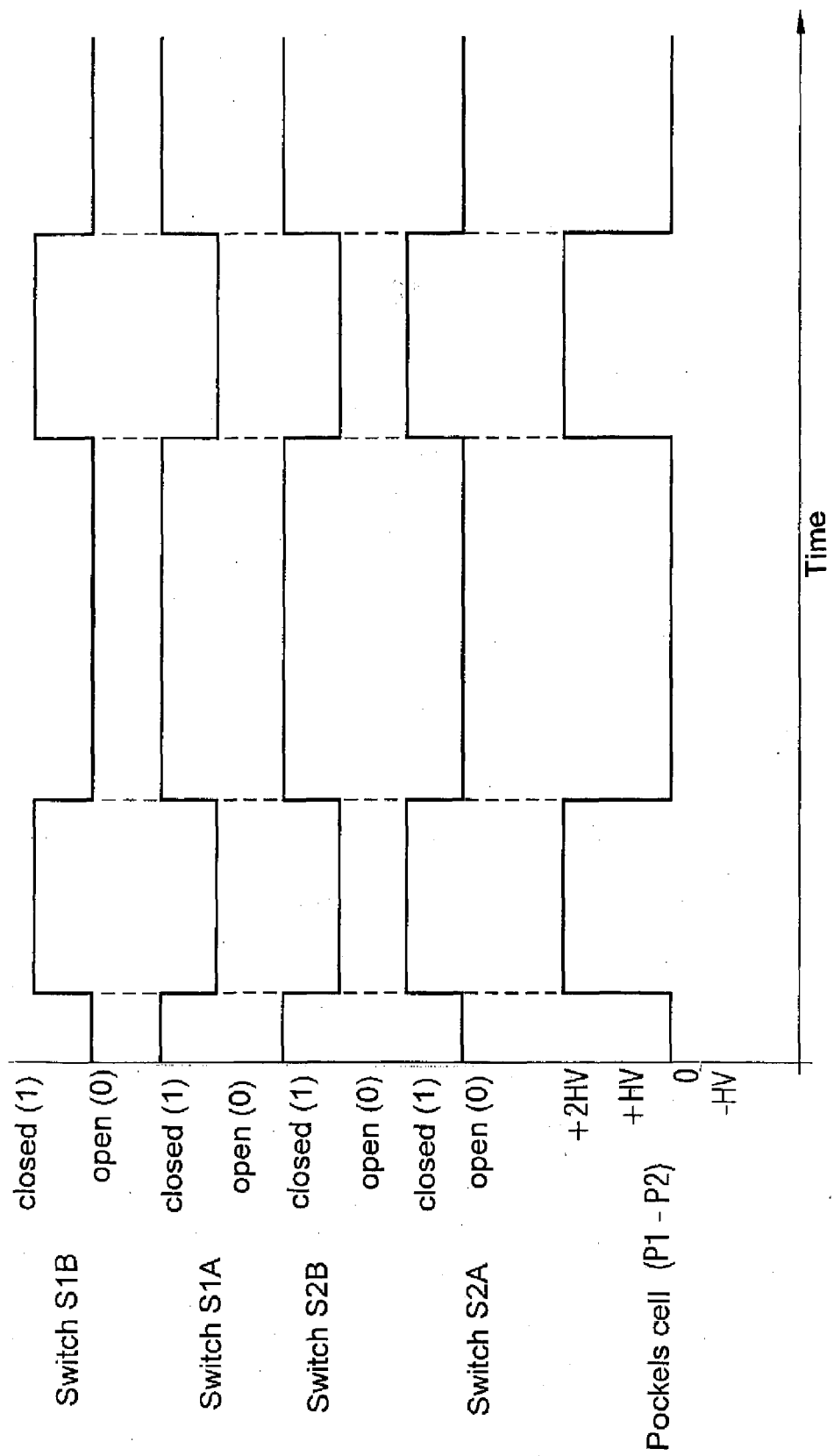

Example embodiments of a driver in accordance with the invention will now be detailed with reference to the figures in the drawings in which FIG. 1 is a circuit diagram of a first aspect of a Pockels cell in accordance with the invention FIG. 2 is a circuit diagram of a further aspect of a Pockels cell in accordance with the invention; and FIG. 3 is a timing diagram of the switching position and of the voltage to illustrate the switching and voltage status of the Pockels cell in one aspect of a method for gating a Pockels cell with the driver as set forth in FIG. 2.

Referring now to FIG. 1 there is illustrated diagrammatically a driver in a general embodiment, it showing likewise the Pockels cell CP gated by the driver. The Pockels cell CP comprises two electric terminals, one of which is, or is to be, connected to a first circuit node P1 and the other to a second circuit node P2. The first circuit node P1 is connected by a first wire conductor across a first switch S1B to a first electric potential HV1. The first circuit node P1 is likewise connected by a second wire conductor across a second switch S1A to a second electric potential HV2.

The second circuit node P2 is connected by a third wire conductor across a fourth switch S2A to a third electric potential HV3. The second circuit node P2 is connected across a third switch S2B to a fourth electric potential HV4.

The electric potentials HV1 to HV4 are selected so that the difference of the potentials HV1–HV4 is greater than the difference of the potentials HV1–HV2 and that the difference of the potentials HV1–HV4 is greater than the difference of the potentials HV3–HV4.

The high-voltage switches S1A, S1B, S2A and S2B are transistor high-voltage switches and may be represented for example by the transistor high-voltage switches as described in the German patent DE 3 630 775 C2.

Referring now to FIG. 2 there is illustrated diagrammatically a driver in accordance with the invention in a special embodiment in which the first electric potential HV1 is furnished by a positive electric potential +HV of the positive pole of a high voltage source whilst the second electric potential HV2 and likewise the third electric potential HV3 is furnished by a GND potential of the driver. The fourth electric potential is furnished in conclusion by a negative electric potential −HV of the negative pole of the voltage source.

Referring now to FIG. 3 there is illustrated a timing diagram of the switching position and of the voltage to illustrate the switching and voltage status of the Pockels cell using the driver as shown in FIG. 2. When a voltage is applied to the Pockels cell CP the first switch S1B and fourth switch S2A are simultaneously closed and the second switch S1A and third switch S2B opened so that a 2·HV is applied to the Pockels cell CP. When on timeout of a predetermined time the Pockels cell CP is to be switched OFF the first switch S1B and fourth switch S2A are simultaneously opened and the second switch S1A and third switch S2B simultaneously closed. The bottommost curve of the diagram shows the status of the voltage at the Pockels cell CP, i.e. the difference between the electric potentials at the circuit nodes P1 and P2. As long as the first switch S1B and fourth switch S2A are closed and the second switch S1A and third switch S2B open the voltage 2·HV is applied to the Pockels cell.

Assuming that a Pockels cell requires a certain switching voltage U which is turned ON/OFF with a repetition rate f, when the switching voltage U is to be forwarded through a single circuit to the Pockels cell, then the electric power P1 consumed by the switch is approximated by:

$$P1 = k \times U^2 \times f \tag{1}$$

where k is a constant.

This applies when, for example, U is to be totally applied to the Pockels cell by a simple push-pull circuit or also in the case of the bridge circuit as shown in FIG. 4 of the German patent DE 102 51 888 B4 for each of the two switches S1B and S2B as shown therein.

But when the driver in accordance with the invention is used as shown in FIG. 1 or FIG. 2 and powered as shown in FIG. 3 then the electric power P2 consumed by each of the two switches S1B and S2A is given by:

$$P2 = k \times (U/2)^2 \times f = P1/4 \tag{2}$$

where U=2·HV is the switching voltage required by the Pockels cell.

Thus one and the same switch is thus powered with half the switching voltage HV. Since two such switches are needed, then $$2 \times P2 = P1/2 \tag{3}$$

for the total electric power consumed. In other words, the two switches together require just half as much electric power as a single one when as in equation (1) a single switch is used to forward the switching voltage. In addition, the electric power required is now shared by two switches.

Thus, to create a certain switching voltage and repetition rate at a Pockels cell significantly less electric power is now needed than in prior art as explained above. If, and to the extent that the repetition rate is limited by the maximum permissible electric power consumption at any one switch the repetition rate can now be increased to the extent as handled by any one switch.

The invention claimed is:

1. A driver for a Pockels cell having a first terminal and a second terminal, the driver comprising:
    a first circuit node connectable to the first terminal of the Pockels cell;
    a second circuit node connectable to the second terminal of the Pockels cell;
    a first voltage source at a first electric potential;
    a first switch connected to the first potential;
    a first wire conductor connecting the first circuit node to the first electric potential through first switch;
    a second voltage source at a second electric potential;
    a second switch connected to the second electric potential;
    a second wire conductor connecting the first circuit note to the second electric potential through the second switch;
    a third voltage source at a second electric potential;
    a third switch connected to the third potential;
    a third wire conductor connecting the second circuit node to the third electric potential through the third switch;
    a fourth voltage source at a fourth electric potential;
    a fourth switch; and
    a fourth conductor connecting the second node to the fourth electric potential through the fourth switch,
    wherein the first potential is more positive than the second potential,
    the third potential is more positive than the fourth potential,
    the difference of the first and fourth potentials is greater than the difference of the first and second potentials, and
    the difference of the first and fourth potentials is greater than the difference of the third and fourth potentials.

2. The driver as set forth in claim 1, wherein the first electric potential is provided by the positive pole of a voltage source and the fourth electric potential by the negative pole of the voltage source.

3. The driver as set forth in claim 1, wherein the second electric potential and the third electric potential equal each other.

4. The driver as set forth in claim 3, wherein the second electric potential and the third electric potential are given by a ground potential.

5. The driver as set forth in claim 1, wherein the second electric potential and the third electric potential differ from each other.

6. The driver as set forth in claim 1, wherein one or more of the switches are each activatable independently of the other by switching pulses.

7. The driver as set forth in claim 1, wherein one or more of the switches are activatable simultaneously by switching pulses.

8. A Pockels cell comprising a driver as set forth in claim 1.

9. Use of a Pockels cell as set forth in claim 8 in a pulsed laser system.

10. A method of gating a Pockels cell comprising a driver as set forth in claim 1, wherein a first voltage is applied to the Pockels cell by simultaneously closing the first switch and the fourth switch and opening the second switch and the third switch.

11. The method as set forth in claim 10, wherein a second voltage is applied to the Pockels cell by simultaneously opening the first switch and the fourth switch and closing the second switch and the third switch.

12. The method as set forth in claim 10, wherein the potentials are selected so that one of the two voltages applied to the Pockels cell is zero.

13. The method as set forth in claim 10, wherein the second and third potentials are ground potentials.

* * * * *